US006850176B2

(12) United States Patent
Laflaquiere et al.

(10) Patent No.: US 6,850,176 B2
(45) Date of Patent: Feb. 1, 2005

(54) METHOD FOR CONVERTING AN ANALOG SIGNAL INTO A DIGITAL SIGNAL AND ELECTROMAGNETIC RADIATION SENSOR USING SAME

(75) Inventors: Arnaud Laflaquiere, Edinburgh (GB); Marc Belleville, St. Egréve (FR); Pierre Castelein, Grendble (FR); Philippe Pantigny, Claix (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/311,077

(22) PCT Filed: Jun. 12, 2001

(86) PCT No.: PCT/FR01/01808

§ 371 (c)(1),
(2), (4) Date: Dec. 12, 2002

(87) PCT Pub. No.: WO01/97506

PCT Pub. Date: Dec. 20, 2001

(65) Prior Publication Data

US 2003/0132871 A1 Jul. 17, 2003

(30) Foreign Application Priority Data

Jun. 13, 2000 (FR) .............................................. 00 07500

(51) Int. Cl.[7] .............................. H03M 1/00; H03M 1/12
(52) U.S. Cl. ...................................... 341/137; 341/155
(58) Field of Search ................................. 341/155, 137, 341/141, 168; 332/109, 207; 250/338.4, 369; 348/241, 300

(56) References Cited

U.S. PATENT DOCUMENTS 4,268,820 A * 5/1981 Hareyama ................... 341/168
5,248,971 A * 9/1993 Mandl ......................... 341/141
5,659,315 A    8/1997 Mandl
5,886,586 A * 3/1999 Lai et al. ..................... 332/109
6,160,504 A * 12/2000 Fields et al. ................ 341/137
6,249,108 B1 * 6/2001 Smedley et al. ............ 323/207
6,333,503 B1 * 12/2001 Chapuis et al. ............. 250/369
6,348,692 B1 * 2/2002 Chapuis et al. ............. 250/369

FOREIGN PATENT DOCUMENTS

| EP | 0 749 234 A1 | 12/1996 |
| EP | WO 98/14002 | 4/1998 |
| EP | 0 954 167 A2 | 11/1999 |

OTHER PUBLICATIONS

Gerard SOU Guo–Neng LU Geoffroy, et al., "A 10–bit 20–Msample/s ADC for low–voltage, low–power applications", May 1998, pp. 88–96.

Bedabrate Pain, et al., "A Low–Power Digital Camera–on–a–Chip Implemented in CMOS Active Pixel Approach", Jan. 1999, pp. 26–31.

* cited by examiner

Primary Examiner—Patrick Wamsley
(74) Attorney, Agent, or Firm—Thelen Reid & Priest, LLP

(57) ABSTRACT

Device converts an analogue signal representing charges resulting from the photo-detection of electromagnetic radiation into a digital signal. Device includes (a) a number of photo-detectors connected in rows and columns through of buses, the photo-detectors in one column sharing the same column bus, itself connected to an output stage by through a row bus, and between each photo-detector and the column bus, (b) an integrator, to integrate the charges arriving from the photo-detector, (c) means for resetting the integrator, and (d) a comparator to compare the voltage $V_p$ from the integrator with an internally predefined threshold voltage $V_s$, characterized in that it also includes a processing device, a clock, the clock controlling the processing device and the processing device receiving a binary value present at the output of the comparator at each signal from the clock.

4 Claims, 4 Drawing Sheets

METHOD FOR CONVERTING AN ANALOG SIGNAL INTO A DIGITAL SIGNAL AND ELECTROMAGNETIC RADIATION SENSOR USING SAME

FIELD OF THE INVENTION

The invention concerns a procedure for the conversion of an analog signal into a digital signal where the analog signal represents an electrical quantity, in particular an electric charge that is to be read. It also concerns an electromagnetic radiation detector using this procedure and, more precisely, a digital elementary point (PEL) that provides digital information at its output for digital processing.

The invention finds applications in the area of the detection of electromagnetic radiation and, in particular infrared radiation, by converting infrared radiation into digital electrical signals.

STATE OF THE ART

In the field of photo-detection, sensors are classically used to convert the photo-signals delivered by basic photo-detectors into electrical signals. This conversion is most frequently performed in part using a set of analog functions performed by an integrated circuit called a "read circuit".

Photo-detectors can be produced directly on the same read circuit, which is the case with photodiodes or photo-arrays of CMOS sensors operating in the visible spectrum.

They can also be produced in a special technological die, then placed on the read circuit using hybrid techniques, which is the case, for example, with so-called "quantum" photo-detectors, operating in the infrared band.

Photo-detectors can also be produced directly on the read circuit by growing a special material, as is the case with resistive microbolometers operating in the infrared band.

Whatever technique is used to produce them, the sensors consist of an array of elementary points called "PELs" connected in rows and columns. Each PEL comprises a photo-detector that performs a first conversion of the photo-signal into a quantity that can be processed by the read circuit, that is a current, a voltage or a charge. Therefore each photo-detector is associated with a PEL.

The PELs may be of the integrating type, that is to say the charges from the photo-detector associated with them are integrated in a charge storage system called an "integrator" and supplying a voltage at its output.

Classically, in a PEL array, all the PELs in a column share the same column bus.

The outputs of the PELs are connected to the column bus in turn by dynamic multiplexing. The end of each column bus is connected to a row bus, which conducts the various signals to the output stage. The electrical quantities are therefore routed by the column buses to the end of the column and then to the output stage where the signals are processed.

FIG. 1 shows a general diagram of a read circuit including PELs 1 connected in columns by column buses 2. Each PEL is connected to the column bus 2 by means of a switch 3, which multiplexes the various PELs onto the column bus. The signals from each PEL in a column are then processed in a processing unit 4. The processing units may be, for example, amplifiers connected in cascade or even transimpedance amplifiers that perform the integration at the end of the column when this is not performed in the PEL. They are connected by a switch 5 to a row bus 6. All the signals supplied by the various column buses 2 are then injected into an output stage 7. Thus the outputs of the column buses 2 share in turn the row bus 6, itself connected to the input of the output stage 7. The output stage passes the information it has received to the output of the sensor.

The sensors are in general of the analog type. In this case, the principle of passing the information to the output of the sensor relies on two-stage multiplexing, that is multiplexing the PELs onto the column bus, then multiplexing the column buses onto the row bus. The multiplexing frequency of the column buses is higher than the multiplexing frequency of the PELs. The bandwidth of the PEL is therefore narrower than that of the processing unit 4, which is itself narrower than that of the output stage 7. There is therefore a compression of the noise spectra of all the blocks in the analog channel with a consequent degradation of the photo-detection performance. In addition, power supply noise can degrade circuit performance, which can have repercussions on nearby electronics (power supply filters, choice of a low-noise power supply). In addition, intrinsic transistor noise imposes constraints on the size of the latter. As a general rule, a transistor will be less noisy the bigger its size.

In addition, electromagnetic interference corrupts analog signals and sometimes imposes constraints concerning the classification and routing of elements of the read circuit.

In addition, temperature variations alter the transfer functions of the analog blocks.

In order to avoid these various problems, digital sensors have been produced. Digital sensors offer the advantage of providing an output signal from the sensor that is already digitised and therefore only requires a simplified interface. In addition, this output can be interpreted directly by nearby digital cards.

In addition, digital sensors are less sensitive to drift and noise from the power supplies and are more resistant to electromagnetic interference between circuits. In addition, a digital signal does not suffer any degradation during transmission between the various functional blocks. Also, digital sensors are less liable to temperature variations.

The article entitled "A 10-bit 20-Msample/s ADC for low-voltage, low-power applications" by G.SOU et al., EUROPTO Conference on Advanced Focal lane Arrays and Electronic Cameras, Zurich, May 1998, SDPIE, vol. 3 410, describes a digital sensor in which the analog/digital conversion is done at the output stage. In this sensor, an analog/digital converter is inserted in the output of the read circuit. In other words, this converter replaces the output stage, marked 7 in FIG. 1, and the output constitutes the new digital interface with the nearby electronics. However, it is essential that this converter operates at video frequency.

The article "A Low-Power Digital Camera-on-a-Chip Implemented in CMOS Active Pixel Approach" by B.PAIN et al. $12^{th}$ International Conference on VLSI Design, January 1999, describes a sensor in which an analog/digital converter is placed at the end of a column. This converter therefore replaces the processing device 4 in FIG. 1. The output stage 7 is then a buffer memory for digital signals. Compared with the previous device, it has the advantage of having a conversion frequency that is less than the video frequency. On the other hand, its location and routing must be implemented within a cell of the array. In addition, it requires a large number of converters since there must be as many converters as there are columns.

Both the devices just described also have the disadvantage of converting analog signals from the relatively remote PELs in the read circuit. In other words, the data collected by the photo-detectors is only converted into a digital signal after being transmitted to the end of a column or to the output stage of the sensor. The data could therefore have already been corrupted on its way to the converter; it is therefore a degraded analog signal that is converted into a digital signal.

In order to avoid this last problem, the devices propose to perform the analog/digital conversion at the PELs. However, this analog/digital conversion can only be done by building an analog/digital converter into each PEL. In fact, its emplacement and routing are greatly limited by the cell dimensions of the PEL in both axes of the array.

U.S. Pat. No. 5,659,315 and U.S. Pat. No. 5,248,971 propose to remedy this problem of space by integrating the first module of an analog/digital converter into the PEL. The converter is thus divided between the PEL and the end of the column. A comparator is then divided between all the PELs in the column. In this case the analog/digital conversion is only effective at the output of the converter at the end of the columns. This architecture implies that each PEL receives an instruction from the conversion module, which considerably increases the complexity of the device and the risk of coupling between PELs.

Patent application EP-A-0 954 167 also proposes to convert the analog signal at the PEL. More precisely, this document proposes a PEL with a digital output. In this case, the conversion is of the classical single ramp type. The voltage ramp is the analog type; conversion is made after the frame. This device has the problem of making the analog/digital conversion after the frame (which can limit the number of images per second) but also of having to deliver an instruction in the form of a variable analog voltage to each PEL.

DESCRIPTION OF THE INVENTION

The purpose of the invention is simply to solve the problems of the techniques described above. For this reason, it proposes a procedure for converting an analog signal representing an electrical quantity into a digital signal, the conversion being performed as close as possible to the photo-detector, that is in an integratin PEL. The procedure of the invention consists in scanning the output state of each PEL, row by row, during a frame onto a single bus for all the PELS in a column.

More precisely, the invention concerns a procedure for the conversion of an analog signal representing an electrical quantity into a digital signal, consisting in integrating the analog signal and comparing the integrated analog signal with a predetermined threshold value. This procedure is characterize by scanning a logical result acquired at the comparison stage M times, from the start of the integration time until the end of the integration time, a digital signal obtained at the output of the comparison stage, having a first binary value when the integrated signal is less than or equal to the threshold value and a second binary value when the integrated signal is greater than the threshold value.

Advantageously, the procedure of the invention consists in determining the period between the start of the integration time and the instant when the threshold value is exceeded as a function of the binary values obtained at the output of the comparison stage.

The procedure can be reset at the start of each integration time.

According to one implementation of the invention, the electrical quantity is an electrical charge, the integrated analog signal is a voltage signal and the period between the start of the integration time and the instant of exceeding the threshold value is an image of the current.

The invention also concerns a photo-detection device using this procedure. More precisely, it concerns a device for the conversion of an analog signal into a digital signal that can be used in a photo-detection device.

This device for converting an analog signal representing charges resulting from the photo-detection of electromagnetic radiation into a digital signal contains a number of photo-detectors connected in rows and columns by means of buses, the photo-detectors in a column sharing the same column bus, itself connected to an output stage by means of a row bus. This device is characterized in that it contains, between each photo-detector and the column bus:

an integrator to integrate the charges arriving from the photo-detector; means for resetting the integrator; and a comparator to compare the output voltage from the integrator with the internally predefined threshold voltage.

Advantageously, the means for initialising include a voltage source associated with a switch.

The integrator may be a capacitor.

BRIEF DESCRIPTION OF DIAGRAMS

FIG. 1, already described, shows a classical analog read circuit;

DETAILED DESCRIPTION OF EMBODIMENTS OF THE INVENTION

The invention concerns a procedure for converting an analog signal resulting from photo-detection into a digital signal, this conversion requiring to be made as far upstream as possible in the signal-processing channel.

For this, the invention proposes to scan, line by line, the output status of each PEL onto a single bus for all the PELs in a column. In other words, the procedure of the invention consists in scanning the quantity of charges obtained during their integration, in a repetitive manner, in order to detect the instant at which this quantity reaches a predetermined threshold value.

The time required to reach this instant when the quantity of integrated charge reaches the threshold value is in fact an image of the value of the flow rate of these charges that is an image of the current; this time is obtained in the form of a binary code.

This procedure of the invention is implemented in a read circuit designed to read the electrical charges produced by the photo-detectors when subjected to electromagnetic radiation and, in particular, infrared radiation.

Figure 1:
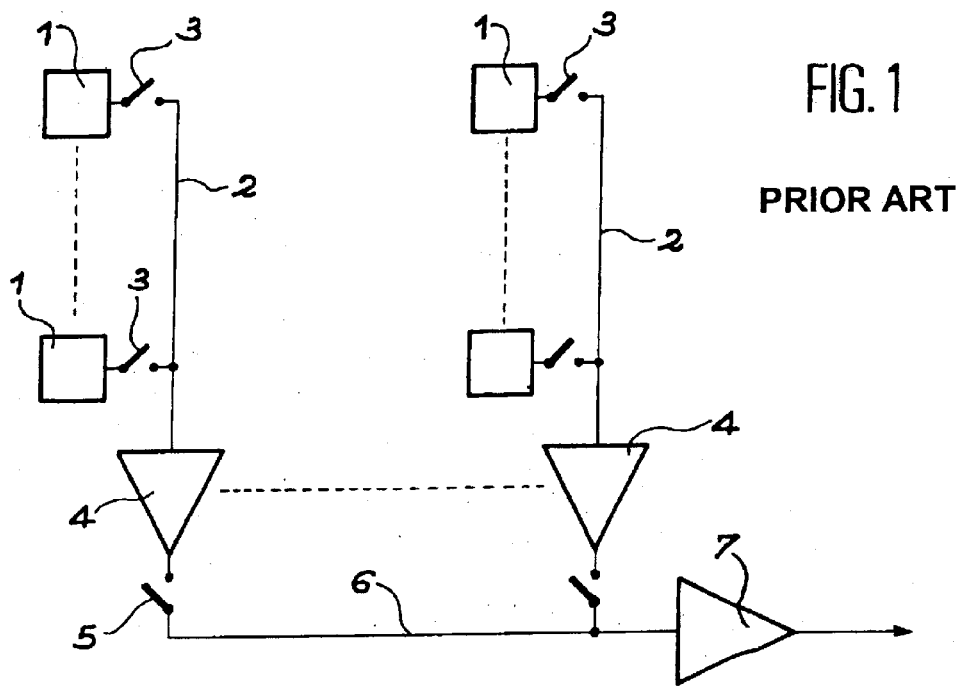
Figure 2:
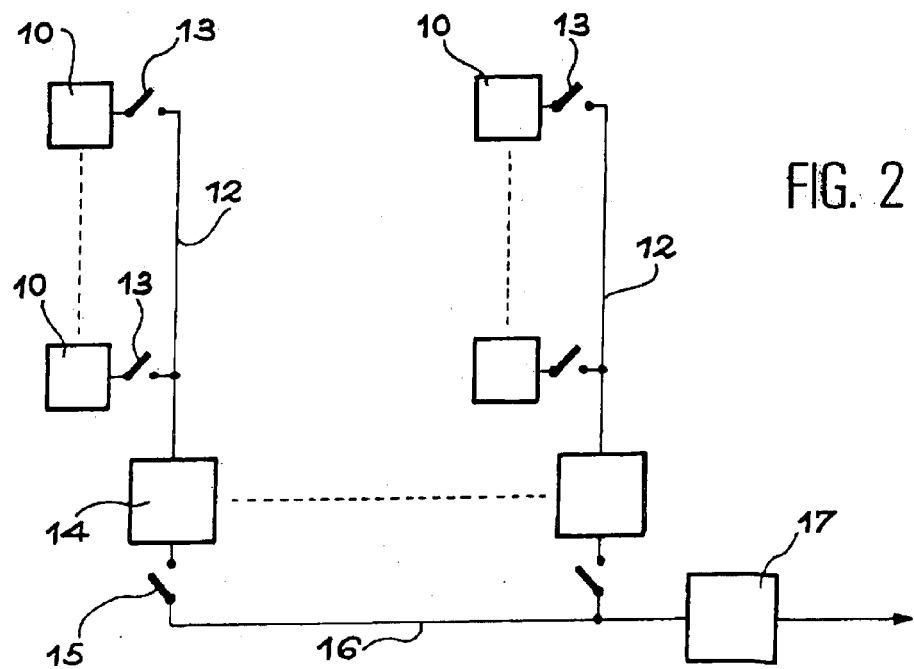
FIG. 2 represents schematically a read circuit including the analog/digital conversion device that is the subject of the invention.

A read circuit implementing this procedure is shown in FIG. 2. This read circuit includes a PEL array 10 connected in columns by a bus 12. The column bus 12 is a bus shared by all the PELs in the same column. Each PEL 10 is thus connected to a bus 12 by means of a switch 13 that multiplexes the data supplied by the various PELs. Each column bus 12 is connected at its end to a digital processing device 14, which digitally processes the signals from the PELs in the column. The outputs of the various digital processing devices 14 are multiplexed by means of switches 15 in order to reach an output stage 17. The data from the digital processing devices 14 is routed to the output stage 17 by a means of a second shared bus 16 called the "row bus".

Figure 3:
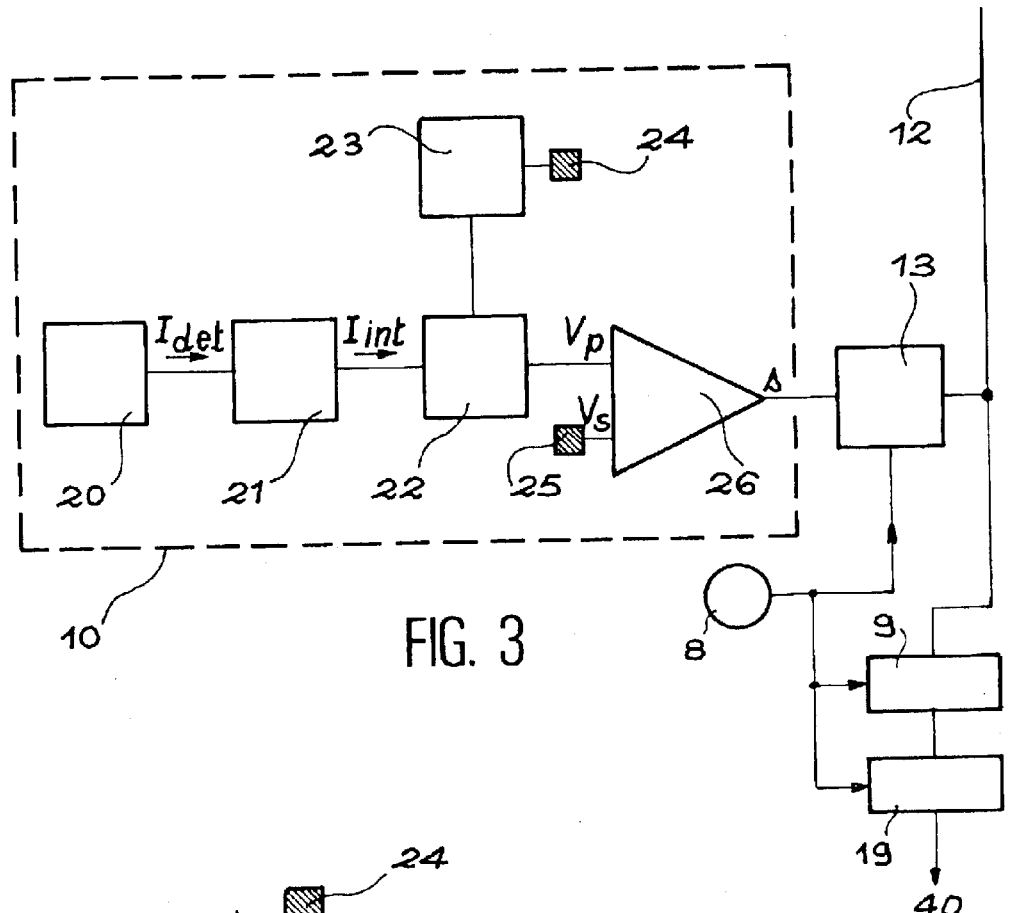
FIG. 3 represents schematically a PEL as used in the device of the invention.

In FIG. 3, one of the PELs 10 in the read circuit in FIG. 2 is shown diagrammatically.

This PEL 10 includes a photo-detector 20 coupled to an integrator 22 by means of an impedance matching device 21. For example, the integrator 22 may be a capacitor.

The photo-detector 20 delivers a current $I_{det}$, which becomes $I_{int}$ when it leaves the impedance matching device 21. The output of the integrator 22 is connected to one of the inputs $V_p$ of a comparator 26, characterized by a threshold voltage $V_s$. To put it more clearly, the voltage $V_s$ is, in this diagram, obtained from an external source 25. It can also be defined by the internal characteristics of the comparator (that is the intrinsic characteristics of the transistors forming the comparator) and then does not require the external source.

The voltage from the integrator 22 is compared by the comparator 26 with the threshold voltage $V_s$. The result of this comparison is produced at the output s of the comparator 26 in the form of binary values. If the voltage $V_p$ of the signal from the integrator 22 is less than the threshold voltage $V_s$, the binary value generated by the comparator 26 is 0. On the other hand, as soon as the voltage $V_p$ becomes great than or equal to the threshold voltage $V_s$ the output of the comparator 26 is set to 1. The value obtained at the output of the PEL 10 is therefore 0 or 1, depending on whether the voltage of the signal relative to the photo-detection device is respectively greater than or less than or equal to a predetermined threshold voltage. The logical value at the output of the comparator 26 is continuously scanned periodically at the rate of a clock 8 controlling the switch 13, a binary processing circuit 9, for example, a memory loaded with values at the clock rate or even a shift register receiving successive logical values. A digital/digital converter 19 controlled by the clock 8 receives the binary values from the processing device 9 and converts the sequence of 0s and 1s into digital values. In this way, the charge collected by the photo-detector 20 is converted into a binary sequence, that is a digital signal at the output of the PEL, before being placed on the column bus.

In fact, as shown in FIG. 3, the output s of the comparator 26 corresponds to the output of the PEL 10 and is connected to a switch 13 linked to the column bus 12.

As explained above, the integrator 22 collects the charges from the photo-detector 20. However, the integrator must be reset after each frame. The integrator 22 is reset by a resetting device 23 and 24. The resetting devices consist of a voltage source 24 supplying a constant voltage $V_r$ through a switch 23. Thus, between each frame, the switch 23 is closed so as to remove the charges collected in the integrator 22 during the previous frame. This step permits a new integration to commence under initial conditions, which are always the same.

Figure 4:
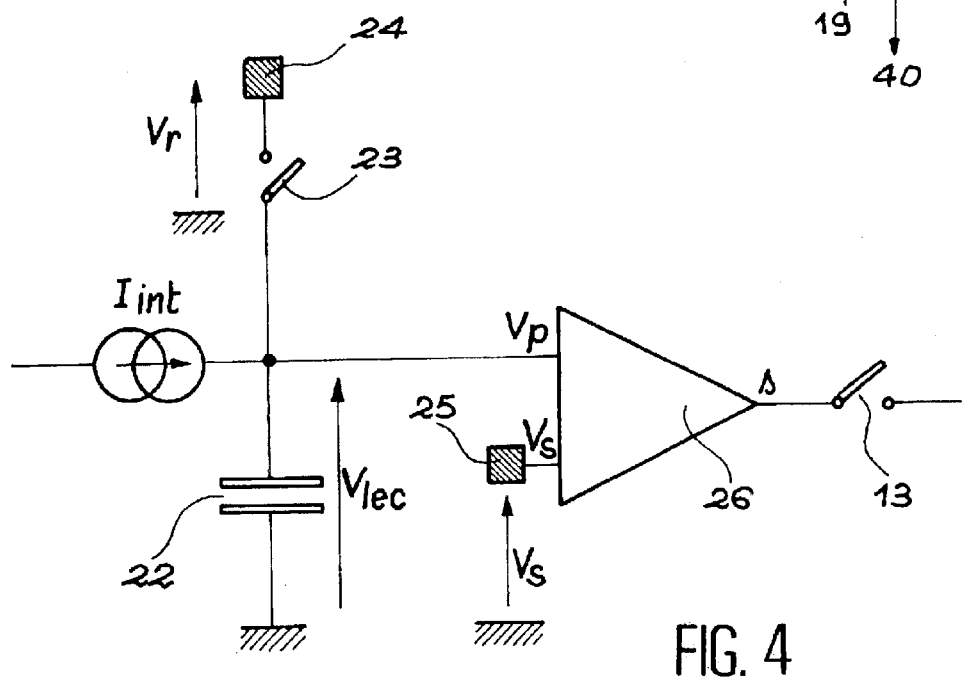
FIG. 4 shows an electrical diagram of the PEL in FIG. 3.

FIG. 4 shows an electrical diagram corresponding to the PEL 10 in FIG. 3. The diagram shows that the input $V_p$ of the comparator 26 is reset to the voltage $V_r$ of the voltage source 24. Therefore when the switch 23 is open, the current $I_{int}$ is integrated by the integrator 22. When the read voltage $V_{lec}$ at the terminals of the integrator 22 exceeds the threshold value, that is as soon as the voltage $V_{lec}$ becomes greater than or equal to the threshold voltage $V_s$, the output of the comparator 26 toggles.

Figure 5:
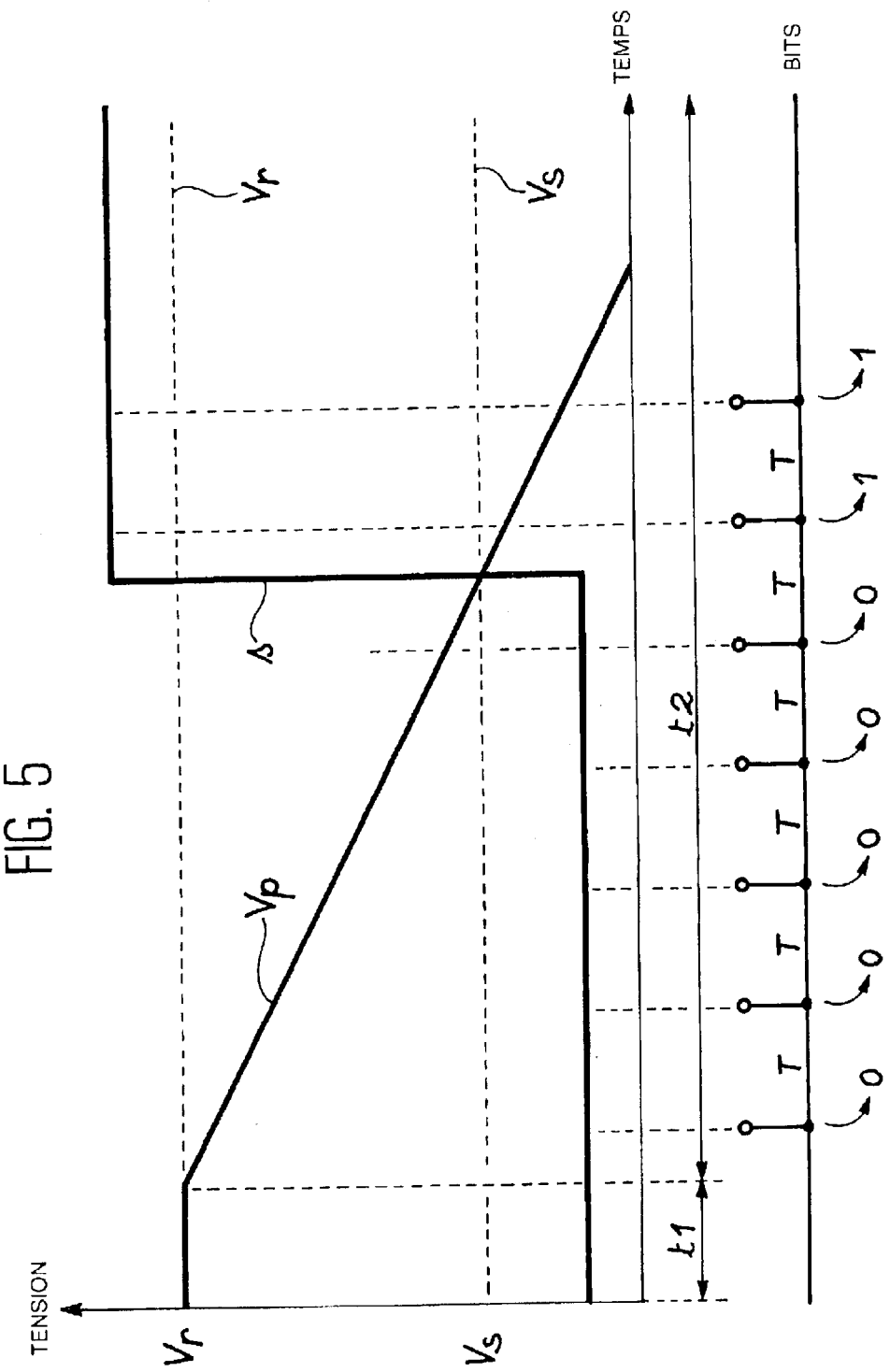
FIG. 5 shows a timing diagram of the signals obtained in a PEL in the device of the invention.

FIG. 5 shows a timing diagram of the various signals produced in the PEL 10 in FIGS. 3 and 4. More precisely, the reset voltage $V_r$, is shown as a dotted line, and the threshold voltage $V_s$ can be seen. The curve $V_p$ shows the voltage relative to the signal from the photo-detector, that is the voltage obtained at the output of the integrator 22 and present at the first input to the comparator 26.

At the instant $t_1$ the switch is closed; the voltage $V_p$ is then at the value of the reset voltage $V_r$. At the instant when the switch 23 opens, the voltage $V_p$ represents the charges arriving from the photo-detector and integrated in the integrator 22. The curve s shows the logical signal obtained at the output of the comparator 26. It can be seen then that, for as long as the value $V_p$ is greater than the threshold voltage $V_s$, the logical signal is set to 0 and as soon as the voltage $V_p$ becomes equal to then less than, the threshold voltage $V_s$, the logical signal is set to 1.

It should be noted that the result of comparison between the voltage $V_p$ and the voltage $V_s$ by the comparator 26 is scanned regularly, from the start of the integration time up to the end of the integration time. The comparisons are repeated at regular intervals T throughout the complete frame. Thus at each interval T, the output s of the comparator 26 supplies a bit of value 0 or 1 forming a sequence of bits that can later be encoded.

FIG. 5 shows the various intervals T between the start of the integration time and the end of the integration time; the binary values obtained at each scan of the comparison during these intervals are also noted. It can therefore be seen from FIG. 5 that before exceeding the threshold value $V_s$ and consequently the resultant toggling of the output s of the comparator 26, each scan, that is each bit value obtained at the output s, sends a logical 0 to the column bus 12. When the threshold $V_s$ is reached and exceeded, the logical state of the output s changes; the scans therefore send the binary value 1 to the column bus 12.

The read time, or integration time, is therefore converted into the form of a string of bits. In the example in FIG. 5, this string consists of 7 bits: 0000011.

In fact, this string of bits corresponds to the time required for the output of the comparator 26 to toggle. In other words, it is the read time $t_{lec}$ that is determined by the procedure of the invention. From FIGS. 3 and 4, the time $t_{lec}$ is expressed as follows $$t_{lec} = \frac{Clec(Vr - Vs)}{I\,int}$$

where $C_{lec}$ is the capacitance of the capacitor 22 and $I_{int}$ is the integrated current representing the number of photons received by the photo-detector.

It should be noted that since each PEL in a column shares the same column bus, the result obtained at the output s of the PEL is multiplexed onto the column bus, that is at a given instant, only one PEL in the column places its data onto the column bus, all the other PELs in the same column having their switch 13 open.

Each column bus in a PEL array is multiplexed in the same way, that is the PELs in a row supply their data at the same time to the column bus with which they are associated. When the data supplied by all the PELs in a row have been processed at the end of the column by the processing device 14, the following row of PELs is selected in order to commence a new scan. When the last row of the PEL array has been processed, the first row of the array is selected again and so on. Scanning is stopped when the integration is complete, that is when the frame has been completed.

As previously explained, the data flowing in the column bus 12 corresponds to a string of bits. This string of bits normally starts with a 0 and ends in a 1. However, if the input flow is too strong, the string of bits may only consist of 1s, the threshold voltage being exceeded before the first scan. On the other hand, if the input flow is too weak and does not reach the switching threshold before the end of the integration time, the string of bits may consist only of 0s.

In order to be processed, the string of bits is converted into binary codes consisting of a number of bits that is less than that of the string obtained by scanning. The string of bits can be encoded using different codes and, for example, it may be encoded in the converter 19 on three bits in accordance with the correspondence below:

| String of bits | Encoded as |
| --- | --- |
| 0000000 | 000 |
| 0000001 | 001 |
| 0000011 | 010 |
| 0000111 | 011 |
| 0001111 | 101 |
| 0011111 | 110 |
| 0111111 | 110 |
| 1111111 | 111 |

In general, in order to encode the string of bits produced by scanning during a frame of N bits, there must be $2^N-1$ scans. For, example, for encoding on 12 bits, $2^{12}-1$ scans are required, that is 4,095 scans for each PEL.

This encoding on 8 bits of the $2^N-1$ binary values obtained from the $2^N-1$ scans, is produced by the processing device 14 for each PEL in the array. For that, the invention proposes that each PEL should be associated with an N bit-processing device mounted in the circuit. Therefore, for each scan of a PEL, it is necessary first to read the previous value recorded in a memory allocated to it, add to it the digital result of the can present on the column bus 12, then rewrite to memory the value obtained after this ddition. It is a matter of adding an N bit binary word in the memory to a 1 bit binary word on the column bus 12. When the $2^N-1$ scans have been completed, $2^N-1$ addition have been made for each PEL in the circuit. All the N bit memories in the circuit then contain the result of the analog digital conversion of the integrated signal for ach PEL. These N bit words are then routed by the row bus to the sensor output 17.

It can therefore be seen that the digital converter 19 converts the sequence of M binary values stored in the processing device into a digital value encoded on a number of bits which is smaller than M.

As can be seen by reading the foregoing, the conversion of the analog signal from the photo-detector 20 is done at the comparator 26. Therefore, only the signal appearing between the output of the photo-detector 20 and the input of the comparator 26 is of the analog type. From the output s of the comparator 26, which corresponds to the output of the PEL 10, the signal is digital. It is then transmitted in digital form to the column bus 12 and to all the processing devices located further on in the read circuit. In other words, no analog type dynamic data is required for the operation of these conversion devices. Only the switches 13 and 21 and the respective supply voltages are needed for its use. A minimum of stimuli is therefore sufficient to ensure correct operation of this digital sensor.

In addition, this digital sensor has the advantage of being able to be easily modified, that is easily converted from application to another since only the values of the capacitor 22 and the voltages $V_r$ and $V_s$ must be redefined to ensure the same transfer function, in accordance with the equation given above. The sensor is therefore compatible with so-called "low voltage" technology as well as with SOI (Silicone on Insulator) technology since few electrical devices process analog quantities.

As described above, the principle of reading the PEL 10 relies on exceeding the threshold of comparison $V_s$. It is the instant $t_{lec}$ of exceeding this threshold that permits encoding of the photonic input current in time. Therefore, whatever the current $I_{int}$, the number of charges integrated in the integrator 22 is the same.

If we call the maximum total charge that can be stored in the integrator $Q_{max}$, then:

$$Q_{max}=q \cdot N_{max}=C_{lec} \cdot (V_r-V_s)=I_{int} \cdot t_{lec}$$

Where q is the charge of one electron (q=1.6e−19C) and $N_{max}$ is the maximum number of charges corresponding to $Q_{max}$.

If the detectors are of the quantum type, then the effective value of the noise associated with a photodiode integrating N charges in a capacitor is given by the following equation:

$$Noise_{detector}=\sqrt{N}$$

Therefore for $N_{max}$ charges integrated in the PEL, we obtain a signal/noise (S/N) ratio which is given by the relation:

$$S/N = \frac{N\ max}{\sqrt{N\ max}} = \sqrt{N\ max} = \sqrt{\frac{Clec.(Vr - Vs)}{q}}$$

Figure 6:
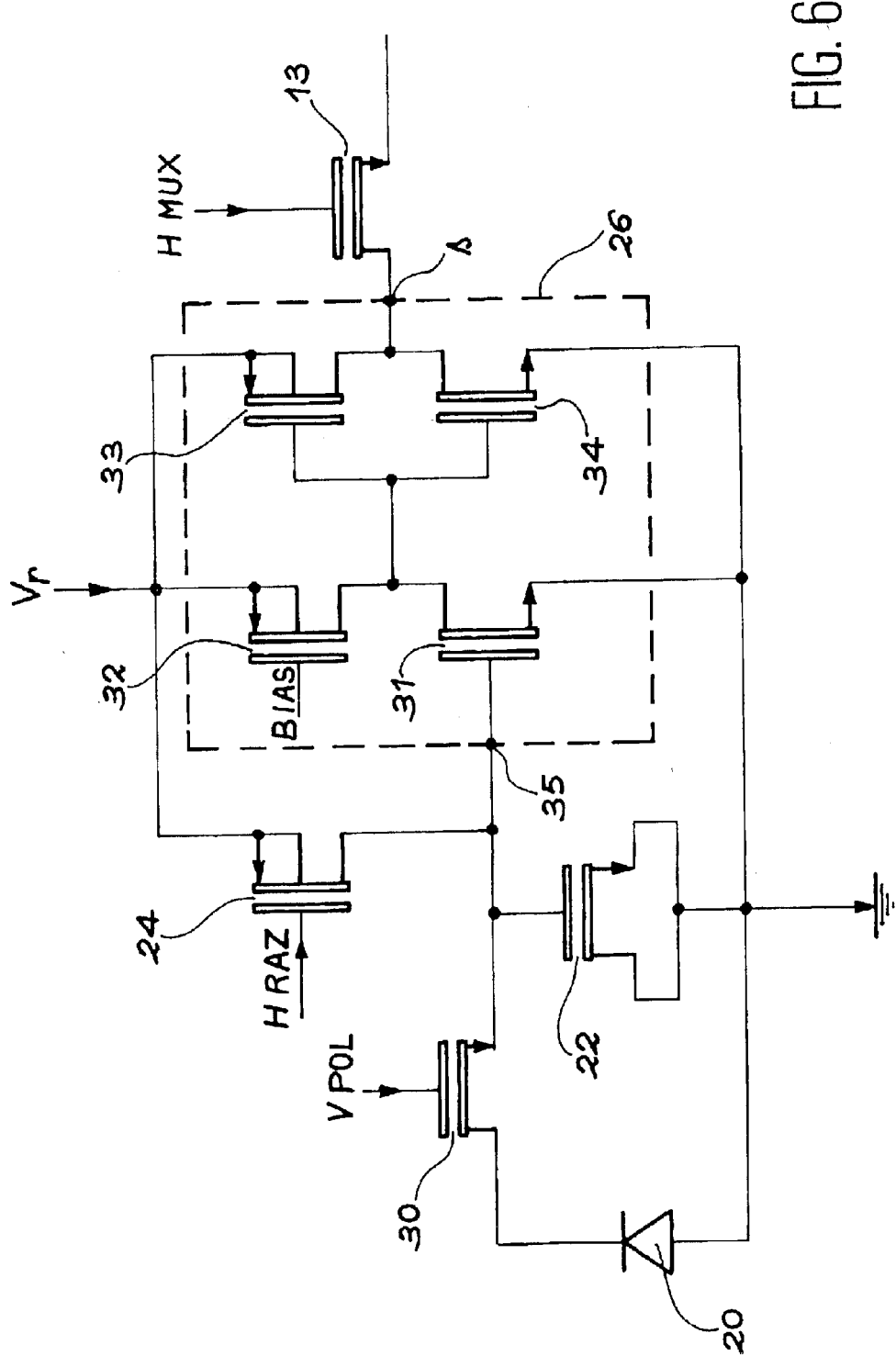
FIG. 6 shows an example of the implementation of a PEL in the device of the invention.

FIG. 6 shows an example of the wiring circuit of a PEL in the device of the invention. In this diagram, the photo-detector is marked 20, as in FIG. 3. A transistor 30 couples the photo-detector 20 with the integration node, marked 35 in the FIG. 6. The charges from the photo-detector is 20 are accumulated in the integrator 22; the transistor 24 resets the node 35 to the voltage $V_r$. The signal VPOL corresponds to the polarisation voltage of the coupling transistor 30 and HRAZ to the reset clock signal; HRAZ is common for all the PELs in the array.

In the example in FIG. 6, the comparator 26 is formed from transistors 31, 32, 33 and 34, which provide at their output s the logical PEL signal. The output s is connected to the switch 13, which itself is connected to the column bus. The HMUX command enables the switch 13 the HMUX command is the multiplexing clock signal and is common to all the PELs in a row. The VPOL and BIAS signals are DC polarising voltages and $V_r$ is the reset voltage of the node 35, but also, in this implementation, the positive supply voltage of the comparator 26.

According to a variant of the invention, it is possible to provide a dedicated HRAZ signal for each row. In effect, the HRAZ clock signal of the integration capacitors 22 is the same for all the PELs in the array. Therefore the integration starts at the same instant for all the PELs. Now it is of interest that only PELs in the same row are scanned synchronously. For this, it is sufficient that each row of PELs has its own reset signal.

What is claimed is:

1. Device for converting an analogue signal representing charges resulting from the photo-detection of electromagnetic radiation impinging on an array of photo-detectors, into a digital signal, comprising:

a number of photo-detectors connected in rows and columns through buses, the photo-detectors in one column sharing the same column bus which is connected to an output stage through a row bus and; between each photo-detector and the column bus, further comprising:

an integrator to integrate the charges arriving from the photo-detector;

means for resetting the integrator;

a comparator to compare the voltage $V_p$ from the integrator with an internally predefined threshold voltage $V_s$;

a processing device;

a clock, the clock controlling the processing device and the processing device receiving a binary value present at the output of the comparator at each signal from the clock and storing it; and digital/digital converter controlled by the clock to convert a sequence of binary values stored in the processing device into a numerical value encoded on a number of bits smaller than the number of logical values stored in the processing device.

2. Device according to claim 1, characterized in that the means for resetting include a voltage source associated with a switch.

3. Device according to claim 1, characterized in that the integrator is a capacitor.

4. Device according to claim 1, characterized in that the integrator is a capacitor.

* * * * *